(12) United States Patent
Kauffman et al.

(10) Patent No.: US 9,852,821 B2
(45) Date of Patent: Dec. 26, 2017

(54) NUCLEAR FUEL ASSEMBLY HANDLING APPARATUS

(71) Applicant: Westinghouse Electric Company LLC, Cranberry Township, PA (US)

(72) Inventors: Adam B. Kauffman, Monroeville, PA (US); David J. Stefko, Jeannette, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 357 days.

(21) Appl. No.: 13/785,448

(22) Filed: Mar. 5, 2013

(65) Prior Publication Data

US 2014/0205050 A1    Jul. 24, 2014

Related U.S. Application Data

(60) Provisional application No. 61/756,136, filed on Jan. 24, 2013.

(51) Int. Cl.
  *G21C 19/105* (2006.01)
  *G21C 19/20* (2006.01)

(52) U.S. Cl.
  CPC ......... *G21C 19/105* (2013.01); *G21C 19/205* (2013.01)

(58) Field of Classification Search
  CPC ................................................... G21C 19/207
  USPC ........................................................ 376/260
  See application file for complete search history.

(56) References Cited

U.S. PATENT DOCUMENTS

| 4,311,557 A | 1/1982 | Kowalski et al. |
| 4,511,531 A * | 4/1985 | Swidwa ................. G21C 19/02 294/906 |
| 4,572,817 A | 2/1986 | Silverblatt |
| 4,834,934 A | 5/1989 | Salton et al. |
| 5,425,070 A | 6/1995 | Gosnell et al. |

(Continued)

FOREIGN PATENT DOCUMENTS

| CN | 1739167 A | 2/2006 |
| CN | 201359859 Y | 12/2009 |

(Continued)

OTHER PUBLICATIONS

International Search Report and Written Opinion of the International Searching Authority for PCT/US2013/074052 dated Sep. 19, 2014 (Forms PCT/ISA/220, PCT/ISA/210, PCT/ISA/237).

(Continued)

*Primary Examiner* — Jack W Keith
*Assistant Examiner* — Lily C Garner
(74) *Attorney, Agent, or Firm* — Joseph C. Spadacene; Westinghouse Electric Company LLC

(57) ABSTRACT

A fuel assembly handling tool that can be lowered onto the top nozzle of a fuel assembly, positively latch the top nozzle, unlatch from the top nozzle, and be raised off the top nozzle of the fuel assembly. The tool head, that interfaces with the top nozzle has load bearing grippers that latch onto the fuel assembly, that are located in a storage position up within the tool while the tool is lowered onto the fuel assembly. The gripper fingers are then lowered into position during the latching process, and are raised back to the storage position during the unlatching process. In the storage position, the gripping fingers are spaced above the fuel assembly top nozzle when the tool head is resting on the nozzle.

6 Claims, 5 Drawing Sheets

(56) References Cited

U.S. PATENT DOCUMENTS

| | | | |
|---|---|---|---|
| 7,386,087 | B2 | 6/2008 | Jublot |
| 2009/0257545 | A1 | 10/2009 | Savinell et al. |
| 2011/0235769 | A1* | 9/2011 | Stefko et al. ................. 376/260 |

FOREIGN PATENT DOCUMENTS

| | | |
|---|---|---|
| CN | 101740149 A | 6/2010 |
| CN | 201622860 U | 11/2010 |
| CN | 201689692 U | 12/2010 |
| EP | 0091580 | 10/1983 |
| JP | H08271683 A | 10/1996 |
| JP | H0985664 A | 3/1997 |
| JP | 3105739 B2 | 11/2000 |

OTHER PUBLICATIONS

Estinghouse Electric Company LLC, EP13876256.2 Supplemental European Search Report, Aug. 10, 2016, 7 pages.

Search Report for Application No. or Patent No. 201380070868.2, dated Aug. 22, 2016, State Intellectual Property Office of the People's Republic of China (2 pages).

* cited by examiner

NUCLEAR FUEL ASSEMBLY HANDLING APPARATUS

CROSS REFERENCE TO RELATED APPLICATION

This application claims priority under 35 U.S.C. §119(e) from Provisional Application Ser. No. 61/756,136, entitled "Retracting Finger Spent Fuel Assembly Handling Tool," filed Jan. 24, 2013.

BACKGROUND

1. Field

The invention relates generally to equipment used to transport nuclear fuel assemblies within a nuclear power generating facility, and more particularly to such a piece of equipment that will not get tangled in the components of a top nozzle of a fuel assembly as the equipment is being aligned to grip the top nozzle.

2. Related Art

In a nuclear reactor power plant, one design of a fuel assembly is comprised of a plurality of fuel elements or rods oriented in a square-shaped array. For a typical pressurized water reactor, there are on the order of approximately 200 to 300 of these elongated fuel rods in each fuel assembly. At either end of the fuel assembly is a top and bottom nozzle which direct the flow of coolant, typically water, through the fuel assembly. Interspersed among the fuel rods are hollow tubes, or thimbles, into which control rods are inserted. The control rods contain neutron absorbent material and are moved into and out of the plurality of guide thimbles to help control the nuclear reaction. These fuel assemblies also contain a centrally located instrumentation tube which allows the insertion of in-core instrumentation during reactor operation. The thimbles and instrumentation tube project between the top and bottom nozzles. Between the top and bottom nozzles, a plurality of spacer grids are positioned at intervals to provide lateral support for the fuel rods. The top nozzle is positioned at the upper end of the fuel assembly and connects to one end of the guide thimbles to allow the load of the entire fuel assembly to be carried from the bottom nozzle, which is connected to the other end of the guide thimbles, with the fuel assembly weight transferred up the guide thimbles to the top nozzle. The fuel assembly top nozzle and bottom nozzle are configured to aid in channeling coolant through the assembly during operation. In this configuration, the weight of the fuel rods is born by the guide thimbles and not by the fuel rods when the fuel assembly is lifted by the top nozzle.

In an equilibrium core a typical fuel assembly will see three operating cycles before it is removed from the reactor and transported under water through a refueling canal to a spent fuel pool in a separate spent fuel building outside the reactor containment.

When handling the fuel assembly, a fixture such as a refueling mast or other overhead crane is positioned over the reactor after the reactor head and upper internals are removed and connected to the top nozzle of the fuel assembly. The fuel assembly is then lifted from the core by the refueling machine which transports the fuel assembly under water through a flooded area in the containment above the reactor vessel, to a fuel assembly transport cart. The transport cart translates the fuel assembly to a horizontal position so it can pass through a refueling canal which connects to the spent fuel pool. A separate fuel handling machine in the spent fuel building uprights the fuel assembly and transports it to an appropriate location within the racks within the spent fuel pool.

Existing designs of spent fuel assembly handling tools built for certain styles of fuel assemblies, such as that described above, include gripper fingers at a fixed elevation below a tool head of the handling tool. These gripper fingers pivot between a latched and unlatched position by raising and lowering an actuator. This design requires an operator to lower the tool onto a fuel assembly until the tool is resting on the top nozzle of the fuel assembly. The existing tools incorporate two alignment "S-pins" that must be inserted in two alignment "S-holes" on the top nozzle by a skilled technician. If the alignment of these pins to the holes is incorrect, the tool can be lowered in an orientation in which the gripper fingers contact or interfere with the top nozzle hold down springs. Such interference can cause the gripper fingers to become locked under the hold down springs requiring non-normal recovery efforts. In the Spring of 2012, a refueling machine gripper was lowered onto a fuel assembly and became stuck due to gripper finger to top nozzle interaction, which caused a seven-day delay in the refueling outage. During the Fall of 2012, a spent fuel tool lowered onto a fuel assembly became stuck due to finger to top nozzle interaction resulting in an 18-hour delay.

The refueling operation usually determines the critical path for an outage during which replacement power has to be purchased at a relatively high cost. Anything that delays the refueling process is to be avoided wherever possible.

Accordingly, it is an object of this invention to provide a fuel handling tool design that will not adversely get caught up in the components of the top nozzle.

Additionally, it is a further object of this invention to provide such a tool design that is simple to operate.

SUMMARY

These and other objects are achieved by a fuel assembly handling tool having a bail configured to be connected to an overhead crane or other hoist. A bail plate is connected to and is freely supported by the bail. A tool body is freely supported at an upper end from the bail plate and extends between the bail plate and a lower end with the length between the upper and lower ends being gauged to access a top nozzle of a fuel assembly. A tool head is connected to the lower end of the tool body and is sized to house a gripper assembly in a withdrawn position so that the gripper assembly is out of contact with the top nozzle of the fuel assembly when the tool head contacts or otherwise rests on the top nozzle. The gripper assembly is operable to extend below its withdrawn position to an extended position to grip a portion of the top nozzle of the fuel assembly to support the fuel assembly as the crane or other hoist lifts the bail. Preferably, an actuator arm is accessible from the bail plate and is operable to extend or withdraw the gripper assembly to the extended or withdrawn position.

In one embodiment, the gripper assembly is moved to the withdrawn position or the extended position by respectively raising or lowering the actuator arm in a linear motion. In one such embodiment, the gripper assembly fully grips the fuel assembly as the actuator arm is lowered. Desirably, the gripper assembly positively locks in the fully withdrawn and fully extended positions. In another embodiment, the fuel assembly handling tool includes guide pins extending down from the tool head for aligning the tool head with the fuel assembly top nozzle.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
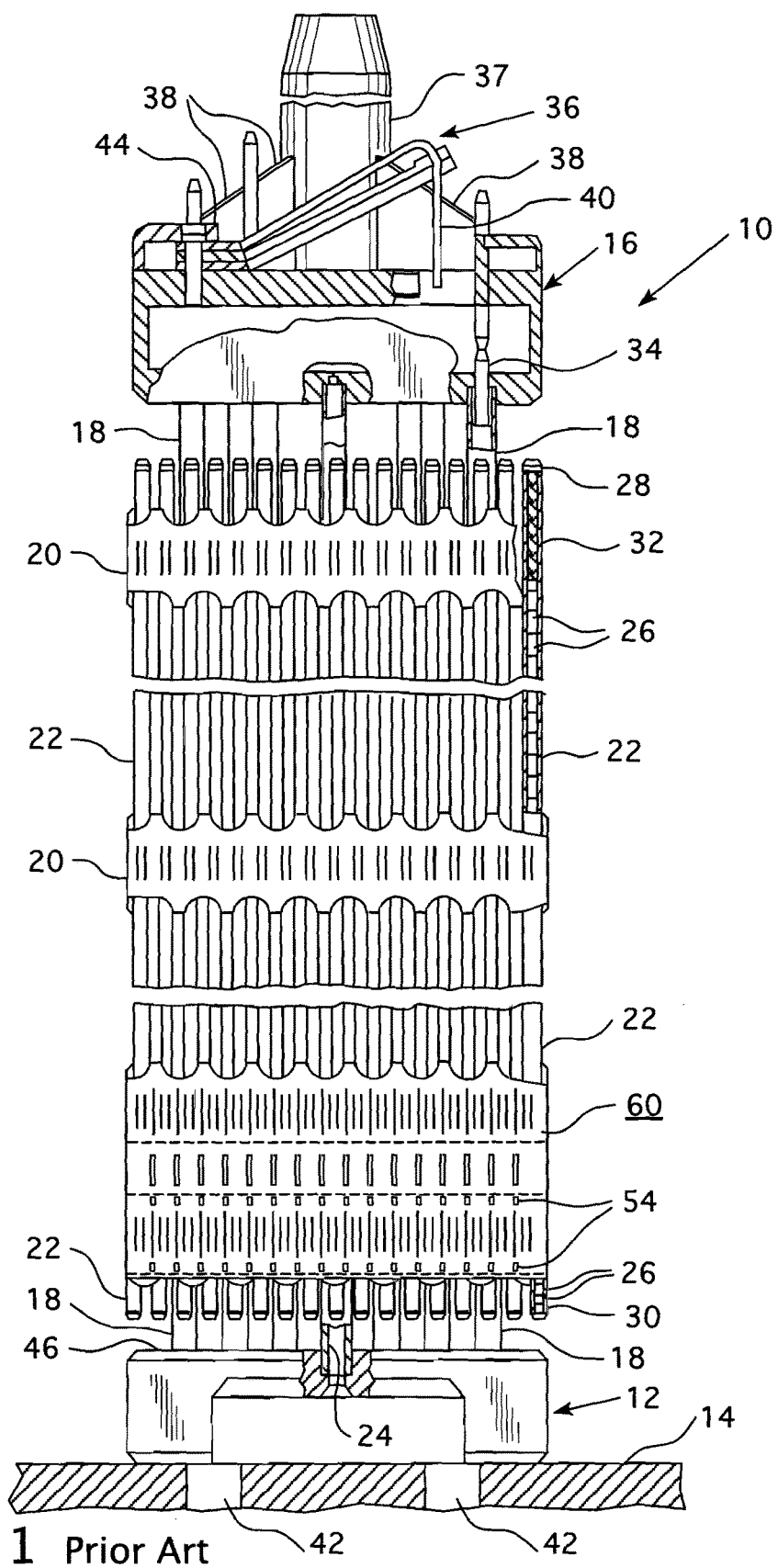
FIG. 1 is an elevational view, partially in section, of a fuel assembly that can benefit from the handling tool of this invention, the fuel assembly being illustrated in vertically shortened form, with parts cut away for clarity.

Referring to the drawings, in particular FIG. 1, there is shown an elevational view of a nuclear fuel assembly, of the type employed in pressurized water reactors, represented in vertically shortened form and generally designated by reference character 10. The fuel assembly 10 has a structural skeleton which, at its lower end, includes a bottom nozzle 12. During the operating life of the fuel assembly 10, the bottom nozzle 12 supports the fuel assembly 10 on a lower core support plate 14 in the core region of the nuclear reactor (not shown). In addition to the bottom nozzle 12, the structural skeleton of the fuel assembly 10 also includes a top nozzle 16 at its upper end and a number of guide tubes or thimbles 18 which extend longitudinally between the bottom and top nozzles 12 and 16 and at opposite ends are rigidly attached thereto.

The fuel assembly 10 further includes a plurality of transverse grids 20 axially spaced along and mounted to the guide thimbles 18 and an organized array of elongated fuel rods 22 transversely spaced and supported by the grids 20. Also, the assembly 10 has an instrumentation tube 24 located in the center thereof and extending between and mounted to the bottom and top nozzles 12 and 16. With such an arrangement of parts, fuel assembly 10 forms an integral unit capable of being conveniently handled without damaging the assembly of parts.

As mentioned above, the fuel rods 22 in the array thereof in the fuel assembly 10 are held in spaced relationship with one another by the grids 20 spaced along the fuel assembly length. Each fuel rod 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The pellets 26, composed of fissile material, are responsible for creating the reactive power of the reactor. A liquid moderator/coolant such as water or water containing boron is pumped upwardly through apertures 42 in the lower core support plate 14 to the fuel assembly 10. The bottom nozzle 12 of the fuel assembly 10 passes the coolant upward along the fuel rods 22 of the assembly in order to extract heat generated therein for the production of useful work. The coolant exits the core through apertures in an upper core plate (not shown) that sits over the fuel assembly. Hold down springs 40 that extend up from the top nozzle 16 seat against the underside of the upper core plate and serve to hold down the fuel assembly, counteracting the upward force exerted by the flowing coolant.

To control the fission process, a number of control rods 34 are reciprocally movable in the guide thimbles 18 located at predetermined positions in the fuel assembly 10. Specifically, a rod cluster control mechanism 36 positioned above the top nozzle 16 supports the control rods 34. The control mechanism has an internally threaded cylindrical member 37 which is coupled to a drive rod (not shown) and a plurality of radially extending flukes or arms 38. Each arm 38 is interconnected to a control rod 34 such that the control rod mechanism 36 is operable to move the control rods vertically in the guide thimbles 18 to thereby control the fission process in the fuel assembly 10, all in a well known manner.

Figure 2:
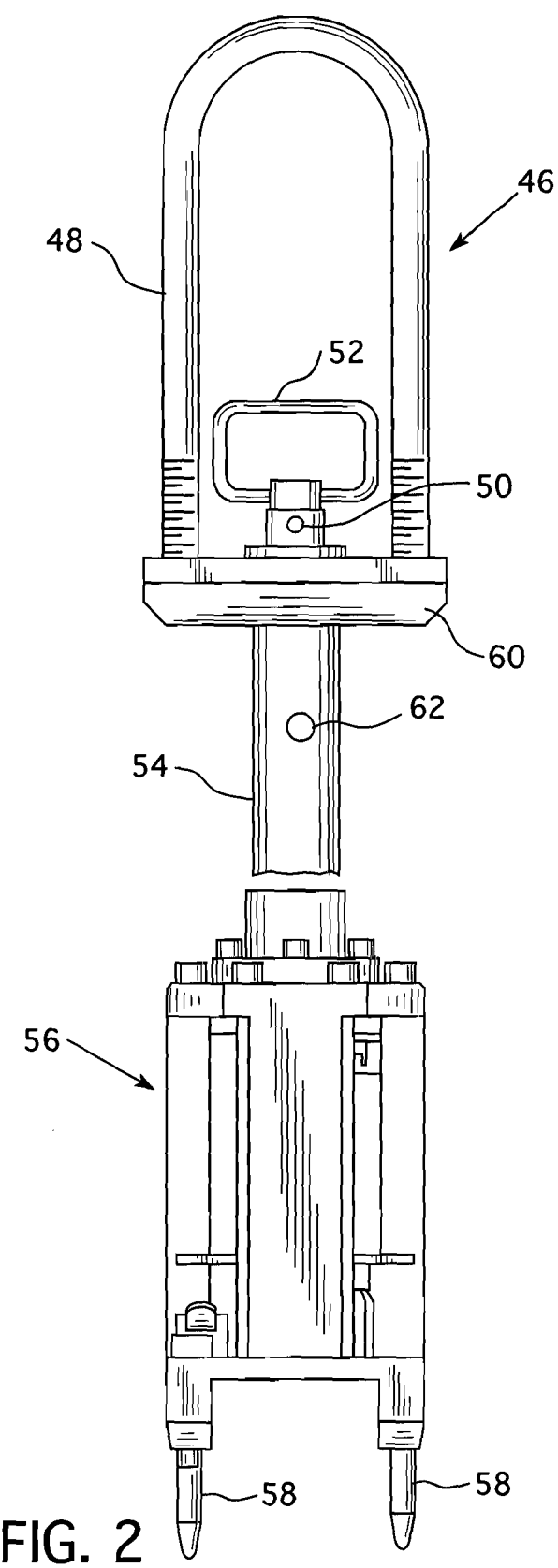
FIG. 2 is a perspective view of one embodiment of the fuel assembly handling tool of this invention showing the bail, actuator handle, body and tool head, with the body shown in vertically shortened form.
Figure 4:
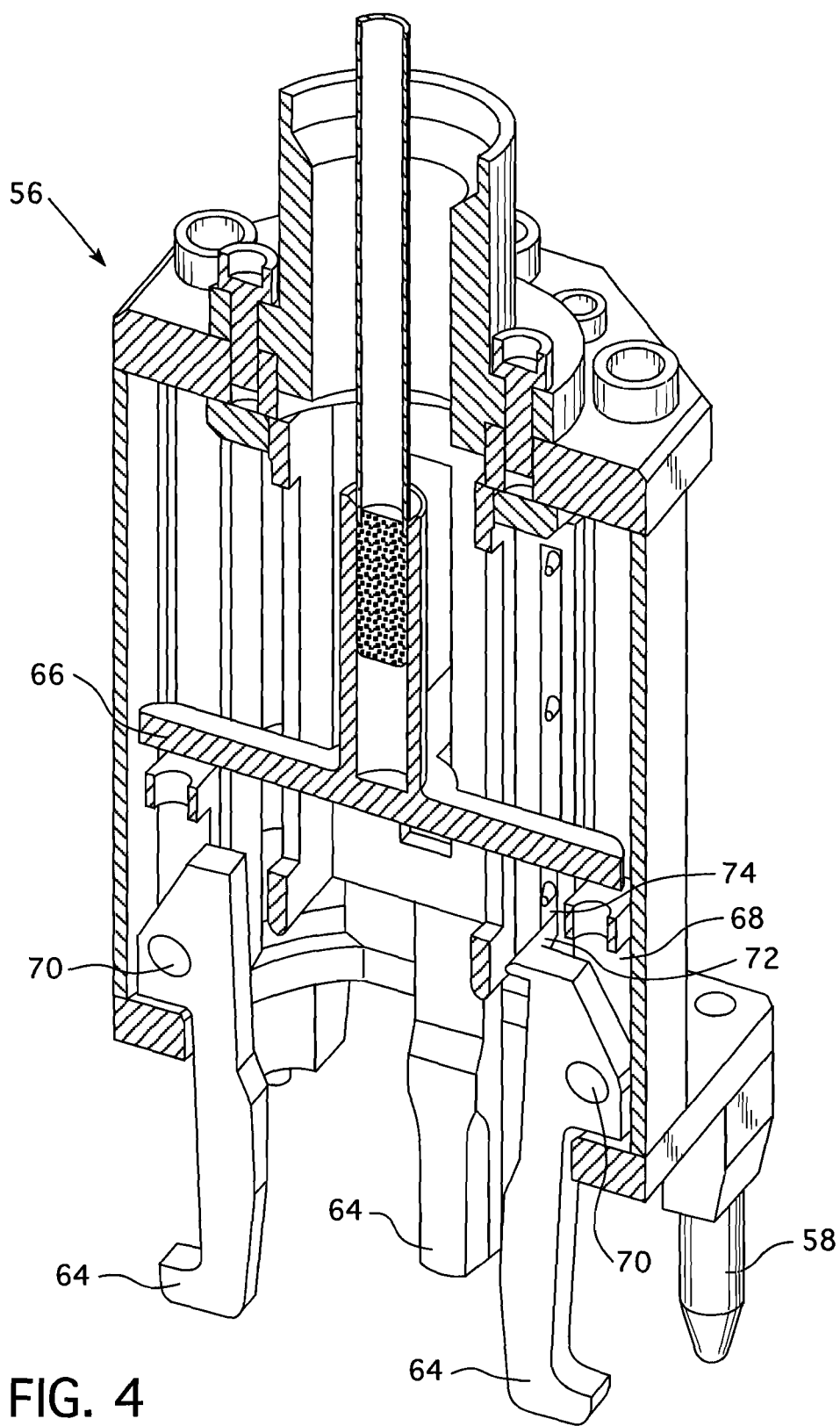
FIG. 4 is an enlarged cross sectional view of the tool head shown in FIG. 3.
Figure 5:
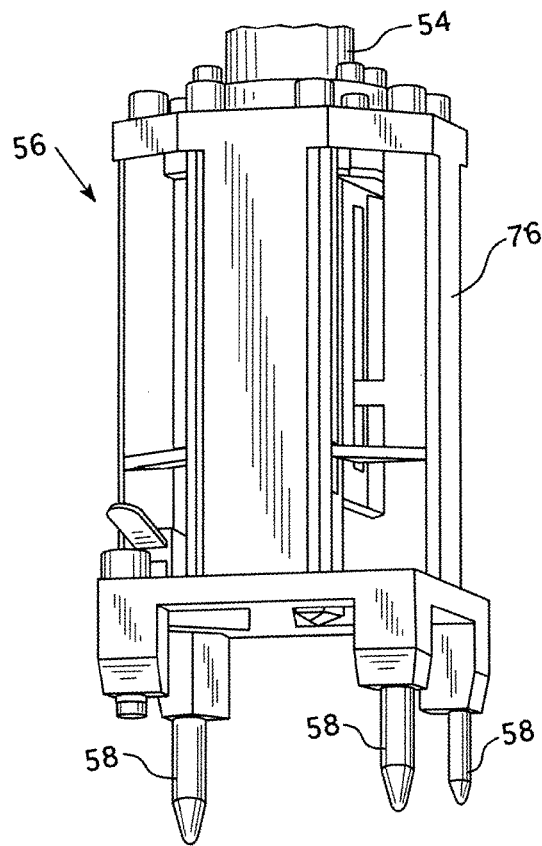
FIG. 5 is a perspective view of the tool head with the gripper fingers shown retracted.

To refuel such a reactor, the refueling area above the reactor is flooded, the reactor head and upper internals are removed, including the upper core plate, to expose the fuel assemblies. A refueling machine is then lowered and actuated to couple with the top nozzle 16 of the fuel assembly, gripping on an upper lip 44. FIG. 2 shows one embodiment of a refueling machine which incorporates the principles of this invention for coupling to and lifting a fuel assembly without the risk of entangling the gripping fingers of the lifting device in the hold down springs 40 or other component parts of the top nozzle. The fuel assembly handling machine 46, shown in FIG. 2, basically includes a bail 48 that is connected to a bail plate 60 that supports the remainder of the tool. The bail 48 is designed to be connected to a hook on an overhead crane that will raise and lower the tool 46. In addition to the bail 48 and bail plate 60, the tool includes a handle 52 that raises and lowers to operate the gripping feature of the tool, a mechanism 62 employed to separately lock the handle in an "engaged" and "disengaged" position, a long and slender tubular tool body 54 and a tool head 56. Alignment pins 58 extend from the lower part of the tool head and are designed to be inserted into corresponding openings in the upper surface of the top nozzle 16 of the fuel assembly 10. The tool head 56 in this embodiment has four gripper fingers 64, three of which can be observed in FIGS. 3 and 4 with all four gripper fingers shown in the perspective view shown in FIG. 6. Though it should be appreciated that any number of gripping fingers may be used. In accordance with this invention, the gripper fingers 64 are retracted in a storage position within the tool head 56 when in a "disengaged" or "unlatched" position as shown in FIG. 5. The gripper fingers 64 are lowered and rotated into place when actuated to the "engaged" or "latched" position. Actuation of the tool is achieved by a single linear motion of the tool handle 52.

Figure 3:
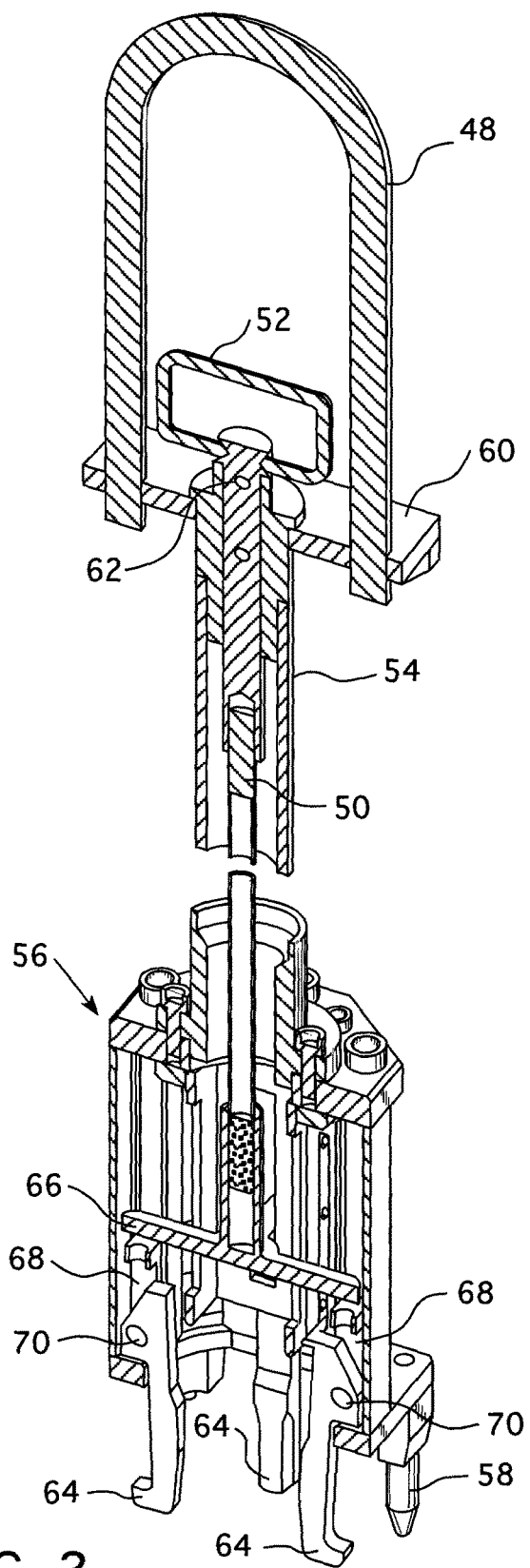
FIG. 3 is a cross sectional view of the fuel assembly handling tool shown in FIG. 2.
Figure 6:
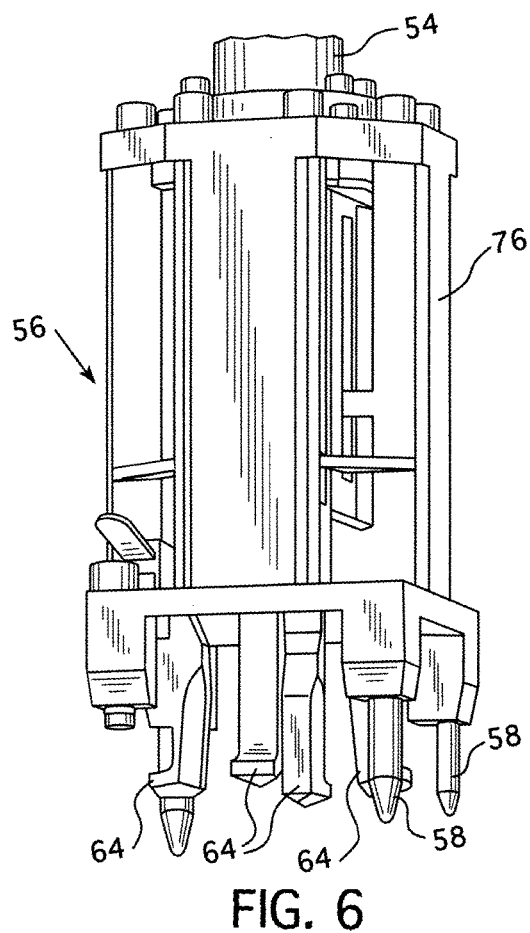
FIG. 6 is a perspective view of the tool head with the gripper fingers shown in the extended position.

As can be seen from the cross sectional view shown in FIG. 3, the tool bail 48, tubular housing body 54 and tool head frame 56 are all fixed and welded or bolted together. The handle 52 is pinned to an actuating rod which is slidably movable within the tool body 54 and extends substantially the whole length of the tool. The actuating rod 50 is attached at its lower end to an actuator 66, which can better be seen in FIG. 4. The actuator 66 is connected to four "carriers" 68. The fingers 64 are respectively pinned at 70 to the corresponding carrier 68, but are able to rotate. Each finger 64 has a lobe 72 that rides in a cam slot 74. As the handle 52 is raised, the actuator rod 50 to which the handle is coupled, raises the actuator 66, the four carriers 68 and the four fingers 64. As the fingers 64 are raised by raising the handle 52, the lobes 72 on each finger ride in the cam slots which rotate the fingers in a specific way determined by the contour of the cam slot. In the image shown in FIG. 4, the tool is shown in an "engaged" position. As the handle 52 is raised, the fingers 64 would raise slightly while rotating approximately 10° in the first half-inch or so of travel. Then, as the handle continues to rise, the gripping fingers rise vertically because the cam slots are vertical from that point up. As previously stated, FIG. 5 shows the tool head 56 in a completely "disengaged" condition with the fingers 64 completely retracted within the tool head housing 76. FIG. 6 shows the fingers 64 in a fully extended and "engaged" condition.

Though, the invention was shown in an embodiment in which four fingers are employed and the disengaged and engaged positions are achieved by way of a single linear motion of the tool handle, to either fully retract or fully extend the gripping fingers relative to the tool head housing, other arrangements are contemplated in which those steps can be separately carried out with any number of grippers.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A fuel assembly handling tool comprising:
   a bail configured to be connected to a crane or other hoist;
   a bail plate connected to the bail as to be freely supported by the bail;
   a tool body freely supported at an upper end from the bail plate and extending between the bail plate and a lower end with the length between the upper and lower ends being gauged to access a top nozzle of a fuel assembly; and
   a tool head connected to the lower end of the tool body and sized to house a gripper assembly having a plurality of radially outwardly extending hooks in a withdrawn position so that the radially outwardly extending hooks are above and out of contact with the top nozzle of the fuel assembly when the tool head contacts or otherwise rests on the top nozzle, the gripper assembly being operable through an actuator to extend the plurality of radially outwardly extending hooks downward below its withdrawn position over a selected travel path that moves the hooks straight downward to an extended position where the hooks are pivoted outward during a last segment of downward extension to grip a portion of the top nozzle of the fuel assembly to support the fuel assembly as the crane or other hoist lifts the bail, with the gripper assembly being operable to reverse the selected travel path under the control of an operator when the fuel assembly is to be released, wherein the hooks for gripping the top nozzle of the fuel assembly have a laterally extending pin projecting from an upper end portion and the gripper assembly further includes:
   a carrier connected to the actuator, being raised and lowered by the actuator and pivotally connected to an upper end of the pin; and
   a cam slot on the tool head in which the laterally projecting pin on the upper end portion of the hook rides, the hook pivoting and raising or lowering as the carrier is raised or lowered by the actuator, wherein the pin riding in the cam slot first lowers the hook and then in a lower portion of the pin's travel in the cam slot the pin pivots the hook as the actuator is lowered.

2. The fuel assembly handling tool of claim 1 wherein the actuator is accessible from the bail plate and operable to extend or withdraw the gripper assembly to the extended or withdrawn position.

3. The fuel assembly handling tool of claim 2 wherein the gripper assembly is moved to the withdrawn position or the extended position by respectively raising or lowering the actuator in a linear motion.

4. The fuel assembly handling tool of claim 3 wherein the gripper assembly fully grips the fuel assembly as the actuator is lowered.

5. The fuel assembly handling tool of claim 2 wherein the gripper assembly positively locks in the withdrawn position and in the extended position.

6. The fuel assembly handling tool of claim 1 including guide pins extending down from the tool head for aligning the tool head with the fuel assembly top nozzle.

\* \* \* \* \*